Figure 1:
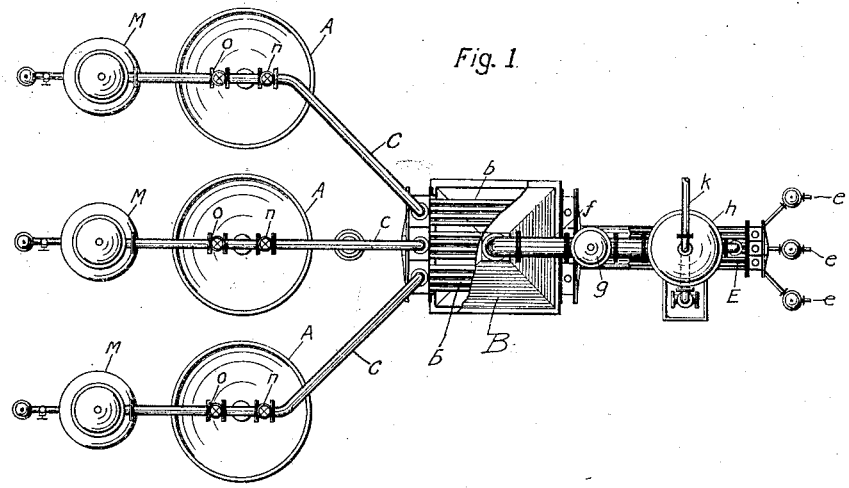

June 3, 1924.

H. C. MERRIAM

METHOD AND APPARATUS FOR DISTILLING PYROLIGNEOUS ACID AND
EVAPORATING ACETATE OF LIME

Filed Sept. 20, 1920

1,496,649

Patented June 3, 1924.

1,496,649

UNITED STATES PATENT OFFICE.

HARRY C. MERRIAM, OF NEWTON, MASSACHUSETTS, ASSIGNOR TO E. B. BADGER AND SONS COMPANY, OF BOSTON, MASSACHUSETTS, A CORPORATION OF MASSACHUSETTS.

METHOD AND APPARATUS FOR DISTILLING PYROLIGNEOUS ACID AND EVAPORATING ACETATE OF LIME.

Application filed September 20, 1920. Serial No. 411,546.

*To all whom it may concern:*

Be it known that I, HARRY C. MERRIAM, a citizen of the United States, residing at Newton, in the county of Middlesex and State of Massachusetts, have invented new and useful Improvements in Methods and Apparatus for Distilling Pyroligneous Acid and Evaporating Acetate of Lime, of which the following is a specification.

The present invention relates to the treatment of the fluid products of wood distillation to make the products of commerce which are derived therefrom, and is more particularly concerned with the treatment of pyroligneous acid to free it of tar, and with the concentration of the weak acetate of lime solution which has been formed by neutralizing the distillate of pyroligneous acid with lime, and has been isolated by a subsequent distillation. For the purposes of this specification pyroligneous acid is to be understood as the entire liquid condensate derived from wood by destructive distillation.

The object of the invention is to improve the methods used in carrying out the operations above referred to, whereby economy in the use of heat is effected; and to provide an apparatus capable of being applied to and used in existing wood distilling plants to carry out such improvements and effect such economies.

In order that the improvements in which my invention consists may be most clearly understood, I deem it helpful to describe briefly the conditions and environment in which it is designed to be used.

A method of treating pyroligneous acid, extensively used, is the following. The pyroligneous acid, as it comes from the wood distillation retorts, is fed into primary stills, either continuously or periodically according to circumstances. The primary stills are heated by high pressure steam to a temperature high enough to evaporate all the constituents of the pyroligneous acid except the tar and other heavy ingredients. The vapors, called the primary distillate, thus evolved by this distillation, free of tar, are condensed, allowed to stand in settling tanks, (where the oils contained in the distillate are decanted) and are then neutralized with milk of lime. This neutralization converts the acetic acid content of said primary distillate into acetate of lime. The neutralized primary distillate is then distilled a second time to separate wood alcohol, methyl acetone, and other volatile ingredients from the acetate of lime content, and when all of the alcohol has been recovered, the remaining acetate of lime solution is transferred to settling tanks and, after settling, brought to steam heated pans where it is evaporated to such a state of concentration that it can be shoveled on to a drying floor to be dried into the form in which it is generally put on the market commercially. The foregoing is a general description of a typical process, which, with variations in detail, is used in great numbers of wood distillation plants. In this typical process, the latent heat of the primary distillate is wasted, and the heat of high pressure steam is used for evaporating the acetate of lime solution.

The improvements which constitute my present invention relate to this process and consist in utilizing the latent heat of the primary distillate vapors for evaporating the acetate of lime solution; in applying the distillate vapors from a number of primary stills for heating a single evaporator, preferably in such a way that the performance of each individual primary still may be observed and tested at any time; and in providing an evaporating apparatus which can be installed in existing wood distillation plants for the evaporation of acetate of lime solution without necessarily altering the existing equipment.

Having thus set forth the general nature and purpose of the invention I will now describe its characteristics and principles in detail with reference to the drawings herewith furnished.

In said drawings, Figure 1 is a diagram illustrating in plan a pyroligneous acid still combined with an evaporator according to the present invention.

Figure 2:
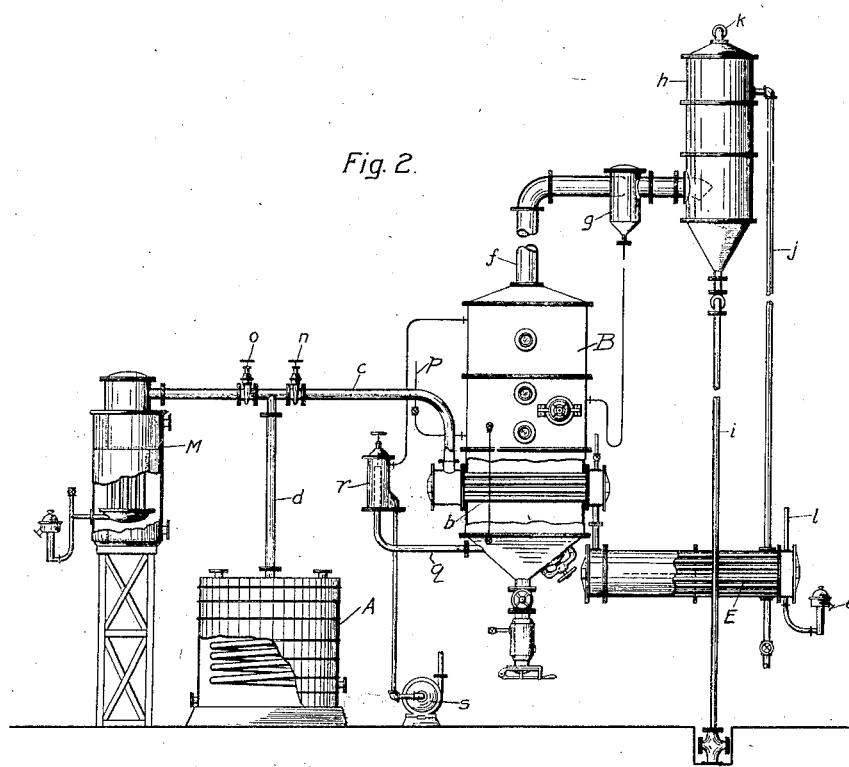

Figure 2 is an elevation of the same diagrammatically indicated apparatus.

Like reference characters designate in both figures the parts of the apparatus which are referred to in this specification.

A, A, A represent a battery of primary stills in which pyroligneous acid from the wood distillation retorts is distilled and from which the primary distillate vapors are evolved. These primary stills are heated by any usual or other convenient means to such temperature as will evaporate the more volatile ingredients without evaporating the tar. B represents an evaporator for the calcium acetate solution. The evaporator comprises a space or chamber to contain the acetate of lime solution, and heating tubes $b$ in the lower part of such space through which hot vapors may pass. An important factor of the invention is that the heating tubes are divided into as many sets or groups as there are primary stills, and each group of heating tubes is connected exclusively to one of the primary stills by pipes $c$ and $d$, and has a separate and exclusive outlet for discharge of the condensed vapors. The heating tubes $b$ may be provided in any form and arrangement, whether as straight or curved tubes, or coils, and in any numbers in each group connected as above described with the several primary stills. More generally considered, the heating tubes are means for producing thermal contact, or interchange of heat, between the primary distillate vapors and the acetate of lime solution, and any other means capable of effecting such thermal contact is equivalent to the means above specified any may be used in this apparatus. For example, the acetate solution may be conducted by tubes through spaces which are independently connected with several stills for admission of vapors therefrom. This part of the evaporator, where interchange of heat occurs, may be called the heating chest, for convenience of description.

The interchange of heat which takes place in the heating chest condenses the vapors of the primary distillate and evolves vapors from the acetate of lime solution. The condensate of the primary distillate vapors passes to a cooler E, which is subdivided similarly to the heating chest and the subdivisions of which are separately connected to the subdivisions of the chest and have separate outlets $e, e, e$. In the cooler the condensate is further cooled, and thence it is led away to settling tanks preliminary to being neutralized with lime and distilled to remove alcohol, etc.

Dilute acetate of lime solution is introduced into the evaporator (preferably continuously) through a pipe $p$, and is there boiled to the desired degree of concentration, not to crystallization, but so near to saturation that crystallization may be caused by a subsequent evaporation with expenditure of relatively little heat. The concentrated solution is withdrawn from the evaporator through a pipe $q$ (and conveniently through a level regulator $r$ also, if desired,) by a pump $s$, which delivers it to suitable apparatus for effecting crystallization, or "seeding", in the technical term of the art.

The vapors from the evaporator are delivered through an up-take pipe $f$ to a catch-all $g$, wherein a separation of the liquid particles from the vapors takes place, and thence to a condenser $h$, preferably of the jet type in which they are condensed. A pipe $i$ leads from the bottom of the condenser $h$ for carrying away the condensed vapors and condensing water. This condenser may be supplied with the same water previously used in the cooler E to cool the primary distillate, a pipe $j$ being here shown as conducting the cooling water discharged from the cooler E to the condenser.

The evaporator B is operated under vacuum in order that evaporation to the desired degree of concentration may there be carried out by the heat of the vapors from the primary still, which are evolved at approximately atmospheric pressure and the necessary extent of vacuum for that purpose is maintained by a pump (not shown) which has its intake connected by a pipe $k$ with the top of the condenser. The pressure in the heating chest is maintained at approximately the atmospheric value by vents $l$, in order to prevent occurrence of either any substantial plus pressure or vacuum in the primary stills A, since such stills as ordinarily constructed are not adapted to withstand much internal or external pressure.

M, M, M represent condensers of the sort heretofore used, connected with the separate stills in essentially the manner heretofore usual in distillation plants. These condensers may be used for condensing the primary distillate vapors when for any reason such vapors are not delivered to the heating chest of the evaporator. Valves $n$ and $o$ are provided to direct the vapor from each still to either the heating chest or the associated condenser M.

By applying the latent heat of the primary distillate vapors for evaporating the lime acetate solution, a supply of heat heretofore wasted is economically utilized, and the expense of furnishing high pressure steam for carrying on this evaporation to a concentration approaching saturation is altogether avoided. Thus a large economy in the operation of wood distillation plants is brought about.

Since the vapors from the separate primary stills are independently conducted through the heating chambers of the evaporator and through the cooler, and are independently delivered to separate outlets, no mixing of the vapors from the several primary stills occurs, and it is possible to examine the distillate from any individual still independently at any time and so observe and regulate the performance of each still.

An evaporator having the characteristics of that here described may be provided in existing wood distillation plants and connected with the stills in which pyroligneous acid is distilled, without requiring any change in the disposition of the plant, without discarding existing apparatus, and without requiring the plant to be shut down even temporarily, or at least without requiring any greater shutting down than the temporary intermission of one still at a time for a period long enough for making therewith the connection which leads from the vapor take-off pipe to the heating chamber in the evaporator.

What I claim and desire to secure by Letters Patent is:—

1. The method of distilling pyroligneous acid and evaporating acetate of lime solution, which consists in boiling the pyroligneous acid product of wood distillation, placing in an evaporator the acetate of lime solution obtained from pyroligneous acid after distillation thereof and after the distillate thereof has been neutralized with lime and distilled to remove volatile ingredients, and conducting the vapors produced by said boiling to said evaporator in thermal contact, but without mixing with said solution, whereby the solution is boiled by the latent heat of said vapors.

2. The method of distilling pyroligneous acid and evaporating acetate of lime solution, which consists in boiling under substantially atmospheric pressure the pyroligneous acid product of wood distillation, placing in an evaporator the acetate of lime solution to be concentrated, maintaining said solution under a pressure less than atmospheric, and conducting the vapors evolved from the boiling pyroligneous acid into thermal contact, without mixing, with said acid solution, whereby the solution is boiled by the latent heat of said vapors.

3. A method of evaporating acetate of lime solution which consists in distilling pyroligneous acid in a plurality of separate stills, separately conducting the hot vapors from said stills into thermal contact with a body of acetate of lime solution, maintaining the separation of the vapors from different stills throughout the course of their thermal contact with said solution, and separately delivering the condensate of the vapors originating in different stills and condensed by such thermal contact.

4. The method of distilling pyroligneous acid and evaporating acetate of lime solution with heat economy which consists in distilling the pyroligneous acid product of wood distillation in a plurality of separate stills at substantially atmospheric pressure, conducting the vapors evolved in the different stills separately into thermal contact with acetate of lime solution, maintaining said solution under pressure less than atmospheric, whereby it is boiled to concentration by the latent heat of said vapors, the vapors at the same time being condensed by heat interchange with the solution, separately delivering the condensate of the vapors from the several stills to a cooler, and maintaining the same separation of the condensate derived from the different stills in its course through, and delivery from, the cooler.

5. An apparatus for distilling pyroligneous acid and evaporating acetate of lime which comprises a primary still, an evaporator having an evaporating chamber and a heating chest, a conduit for leading vapors from said primary still to said heating chest, an outlet from the heating chest for delivering said vapors and the condensate thereof unmixed with other vapors after transfer of heat to the solution in the evaporating chamber, a separate outlet from said evaporating chamber for carrying away the vapors evolved from the solution, and a condenser with which said last-named outlet is connected, and from which the outlet from the heating chest is excluded.

6. An apparatus for distilling pyroligneous acid and evaporating acetate of lime which comprises a primary still, an evaporator having an evaporating chamber and a heating chest, a conduit for leading vapors from said primary still to said heating chest, an outlet from the heating chest for said vapors and condensate thereof after transfer of heat from the latter to the solution in the evaporating chamber, an outlet from said evaporating chamber through which the vapors evolved from the solution being evaporated are discharged, and means for maintaining in said evaporating chamber a pressure less than atmospheric.

7. An apparatus for distilling pyroligneous acid and evaporating acetate of lime comprising a plurality of separate primary stills adapted to boil pyroligneous acid, an evaporator having an evaporating chamber, means for causing and maintaining a pressure within said evaporating chamber less than atmospheric pressure, said chamber also having separate non-communicating vapor conducting passages arranged to exclude the vapors contained in them from said evaporating chamber and to deliver heat from such vapors to the liquid in said chamber, separate vapor conducting means between the different stills and the respective separate vapor conducting passages, and separate delivery outlets from said passages.

In testimony whereof I have affixed my signature.

HARRY C. MERRIAM.